(12) United States Patent
Toda

(10) Patent No.: US 8,542,403 B2
(45) Date of Patent: Sep. 24, 2013

(54) IMAGE FORMING APPARATUS, COLOR CONVERSION CONTROL METHOD, RECORDING MEDIUM, AND INFORMATION PROCESSING APPARATUS HAVING PRINTER DRIVER

(75) Inventor: Hideki Toda, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 601 days.

(21) Appl. No.: 12/801,321

(22) Filed: Jun. 3, 2010

(65) Prior Publication Data

US 2010/0321712 A1 Dec. 23, 2010

(30) Foreign Application Priority Data

Jun. 19, 2009 (JP) ................................. 2009-146986

(51) Int. Cl.
*G06F 15/00* (2006.01)
*G06K 1/00* (2006.01)
*H04N 1/60* (2006.01)
*G03F 3/08* (2006.01)

(52) U.S. Cl.
USPC ........................................... 358/1.9; 358/518

(58) Field of Classification Search
None
See application file for complete search history.

(56) References Cited

U.S. PATENT DOCUMENTS

| 8,077,354 B2* | 12/2011 | Tomomatsu | 358/1.9 |
| 2002/0036785 A1 | 3/2002 | Sasaki | |
| 2003/0228184 A1 | 12/2003 | Nishitani | |
| 2008/0174792 A1* | 7/2008 | Nishi | 358/1.6 |
| 2008/0198391 A1 | 8/2008 | Suzuki | |

FOREIGN PATENT DOCUMENTS

| JP | 2002-099401 | 4/2002 |
| JP | 2003-289446 | 10/2003 |
| JP | 2004-7415 | 1/2004 |
| JP | 2008-167422 | 7/2008 |

OTHER PUBLICATIONS

Extended European Search Report dated Apr. 30, 2012, issued in European Application No. 10251085.6.
Notice of Rejection for corresponding Japanese patent application No. 2009-146986 dated Mar. 12, 2013.

* cited by examiner

*Primary Examiner* — Douglas Tran
(74) *Attorney, Agent, or Firm* — Harness, Dickey & Pierce, P.L.C.

(57) ABSTRACT

An image forming apparatus is disclosed that performs a color conversion process in accordance with a color conversion setting set by an information processing apparatus that generates print data. The image forming apparatus includes a determination unit determining whether a valid color conversion setting has been performed by the information processing apparatus based on received print data; and a control unit controlling the color conversion process to be performed by the image forming apparatus based on a result determined by the determination unit.

9 Claims, 14 Drawing Sheets

FIG.7

50 SAMPLE PRINT DATA

| ICM SETTING | SAMPLE PRINT DATA |
|---|---|
| ICM PROCESS BY HOST SYSTEM (COLOR CONVERTED IN HOST) | %%% CRD IS NOT DOWNLOADED FROM HOST<br><br>%%% DATA COLOR-CONVERTED BY HOST<br>/DeviceRGB dup setcolorspace /colspABC exch def<br>: 1188 1517 24 1167 1462 1928 1155 0<br>beginjpeg s4IA0!"\_al8O [¥!W\`:e!1!Tbs6Te;:hXchDf]T1E$}-qh0E=(!8PK<Szl"]-r!!!!"!!\*(c!!!"<br>!!3,fl" M;\*Ddm8XAAA0F!!3,S!/(=V" 9¥i2" 9o#5" pkJ; pkYC" pP>@$jm=L$471Q$k\*OQ$¦k\*[U<br><br>rEj]=¥)6IrrB^,abKu[f6?.m]onE-kshal9E1&'J¥plakF@\_<la@-]5FdlTlaOeb<8!!4Y1q<br>rT\*KL^7k@<rr?-VC]<8cTD+Pg?iSd"> endjpeg |  (50a)  |
| ICM PROCESS BY PRINTER (CRD FOR COLOR CONVERSION IS DOWNLOADED FROM HOST) | %%% CRD IS DOWNLOADED FROM HOST<br>/CRD5D70448<br>%\*\* CRD Begin<br>currentglobal true setglobal<br>globaldict begin<br>/lnp\_0A2B0<br><0016222a32383d42474b4f53575a5d60<br>6366696c6f7174767876d7f81838587<br>...<br>%\*\* CRD End<br>def<br>/Perceptual CRD5D70448 /ColorRendering defineresource pop<br>/Perceptual /ColorRendering findresource setcolorrendering<br><br>%%% DATA NOT COLOR-CONVERTED BY HOST | (50b) |
| ICM PROCESS BY PRINTER ADJUSTMENT (CRF FOR COLOR CONVERSION IS SPECIFIED BY HOST) | %%% INDENT OF CRD IS SPECIFIED BY HOST (NO CRD IS DOWNLOADED,<br>%%% PRINTER BUILT-IN CRD IS USED)<br>/Perceptual /ColorRendering findresource setcolorrendering<br><br>%%% DATA NOT COLOR-CONVERTED BY HOST | (50c) |

IMAGE FORMING APPARATUS, COLOR CONVERSION CONTROL METHOD, RECORDING MEDIUM, AND INFORMATION PROCESSING APPARATUS HAVING PRINTER DRIVER

CROSS-REFERENCE TO RELATED APPLICATIONS

The present application claims priority under 35 U.S.C §119 based on Japanese Patent Application No. 2009-146986 filed Jun. 19, 2009, the entire contents of which are hereby incorporated herein by reference.

BACKGROUND OF THE INVENTION

1. Field of the Invention

The present invention generally relates to an image forming apparatus such as a PostScript® printer and an information processing apparatus having a PostScript® (hereinafter "PS") driver, and more particularly to a technique of a color conversion process based on a command (PS operator).

2. Description of the Related Art

For example, Japanese Patent Application Publication No. 2002-99401 disclosed an image forming apparatus capable of being prevented from performing two separate color adjustments so as to achieve high-quality printing when an application sending a request for printing is capable of performing a color adjustment process. On the other hand, Japanese Patent Application Publication No. 2008-167422 discloses an image forming apparatus capable of, when the CRD (Color Rendering Directory) is switched for each of drawing objects, improving the performance of color processing on a document in which CIE (Commission Internationale d'Eclairage) colors are specified.

As disclosed in the above Patent Documents, a color printer generally has a color conversion function.

However, conventionally, settings of the color conversion function may be difficult for general users. Because of this, it may be difficult for those users to achieve high-quality printed images.

For example, a process of color conversion (hereinafter "color conversion process") may be performed by both a PC (Personal computer) generating print data using a printer driver and an image forming apparatus processing the generated printed data. In this case, however, these color conversion processes are performed independently from each other and no exclusive processing (exclusive control) is performed.

Further, settings of color conversion (hereinafter "color conversion setting(s)") typically include a setting using an Adobe command (standard operator (command)) and a setting using a vendor command. In the setting using the vendor command, an extended command (extended operator (command)) defined by the vendor is provided so that the color conversion process using the extended command can be optimally adapted to the input/output characteristics of the vendor's image forming apparatus. Namely, the setting of the vendor is optimized for the vendor's image forming apparatus. Therefore, generally, the color conversion process by using the vendor's command has been set to be used as the default color conversion process.

Further, typically, the color conversion settings are performed using plural UI (User Interface) menus of the printer driver and the application. In this case, the color conversion settings are performed independently from each other and no exclusive processing (exclusive control) is performed. Further, in the UI menu(s), a setting item which is common among all the color conversion settings cannot be commonly set (i.e., the UI menus are not determined in the same manner among different color conversion settings). Because of this inconvenience, different UI menus are required to be used even when a common setting item is set.

Because of those features, the user is required to sufficiently understand the characteristics (features) of the color conversion processes and the color conversion settings in advance to obtain a desired print result (or a high-quality print result). This means that the user has to find (determine) the optimal settings by himself/herself and set using appropriate UI menus. This operations, however, may be difficult and cumbersome for most users. Due to this inconvenience, when intending to use a conventional color conversion function as described above, a user may set a wrong setting, so that different color conversion settings having an exclusive relationship with each other (e.g., plural (different) color conversion settings using the standard command and the extended command) are mixed in the data to be printed (print data). As a result, a desired (high-quality) print result may not be easily obtained.

SUMMARY OF THE INVENTION

The present invention is made in light of the above circumstance, and may provide an image forming apparatus, a color conversion control method, a recording medium having a color conversion control program, and an information processing apparatus having a printer driver, which allow a user to easily obtain a desired (high-quality) print result even when both the information processing apparatus and the image forming apparatus can perform the color conversion settings and the respective color conversion settings, the information processing apparatus generating print data, the image forming apparatus processing the print data, the color conversion setting being performed by using plural kinds of commands including the standard command and the extended command.

According to an aspect of the present invention, there is provided an image forming apparatus performing a color conversion process in accordance with a color conversion setting set by an information processing apparatus that generates print data. The image forming apparatus includes a determination unit determining whether a valid color conversion setting has been performed by the information processing apparatus based on received print data; and a control unit controlling the color conversion process to be performed by the image forming apparatus based on a result determined by the determination unit.

By having this configuration, the image forming apparatus according to this aspect of the present invention may determine whether the valid color conversion setting has been (set) performed by the information processing apparatus. When determining that any valid color conversion setting has not been performed, the image forming apparatus may perform a color conversion process set by using an extended command (extended color conversion process). On the other hand, when determining that a valid color conversion setting has been performed, the image forming apparatus may perform a process in accordance with the color conversion setting set in the information processing apparatus.

By doing in this way, in the image forming apparatus according to the aspect of the present invention, it may become possible to control in a manner such that a higher priority is placed on a process in accordance with the color conversion setting of the information processing apparatus (standard color conversion process) than on the extended color conversion process of the image forming apparatus. As a result, it may become possible to obtain a desired print result easily even in a case where the color conversion setting may be set by using a standard command and an extended command and when the color conversion setting may be performed in the information processing apparatus generating print data and the image forming apparatus processing the print data.

According to another aspect of the present invention, there is provided a color conversion control method to be used in an image forming apparatus performing a color conversion process in accordance with a color conversion setting set by an information processing apparatus that generates print data. The color conversion control method includes a determination step of determining whether a valid color conversion setting has been performed by the information processing apparatus based on received print data; and a switching step of, when determining that the valid color conversion setting has been performed by the information processing apparatus in the determination step, switching the color conversion process to be performed by the image forming apparatus from an extended color conversion process to a standard color conversion process, the extended color conversion process being in accordance with a color conversion setting set by using a vendor's own extended command, the standard color conversion process being in accordance with a color conversion setting set by using a standard command.

By executing in this way, the color conversion control method according to this aspect of the present invention may determine whether the valid color conversion setting has been performed by the information processing apparatus. When determining that any valid color conversion setting has not been performed, a color conversions process set by using an extended command (extended color conversion process) may be performed. On the other hand, when determining that a valid color conversion setting has been performed, a process in accordance with the color conversion setting set in the information processing apparatus (standard color conversion process) may be performed.

By executing in this way, in the color conversion control method according to the aspect of the present invention, it may become possible to obtain a desired print result easily even in a case where the color conversion setting may be set by using a standard command and an extended command and when the color conversion setting may be performed in the information processing apparatus generating print data and the image forming apparatus processing the print data.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

In the following, a description will be given in detail of preferred embodiments of the present invention with reference to the accompanying drawings.

FIRST EMBODIMENT

Hardware Configuration

First, a description will be made in detail of a hardware configuration of an information processing apparatus generating print data and an image forming apparatus processing the print data.

Information Processing Apparatus

Figure 1:
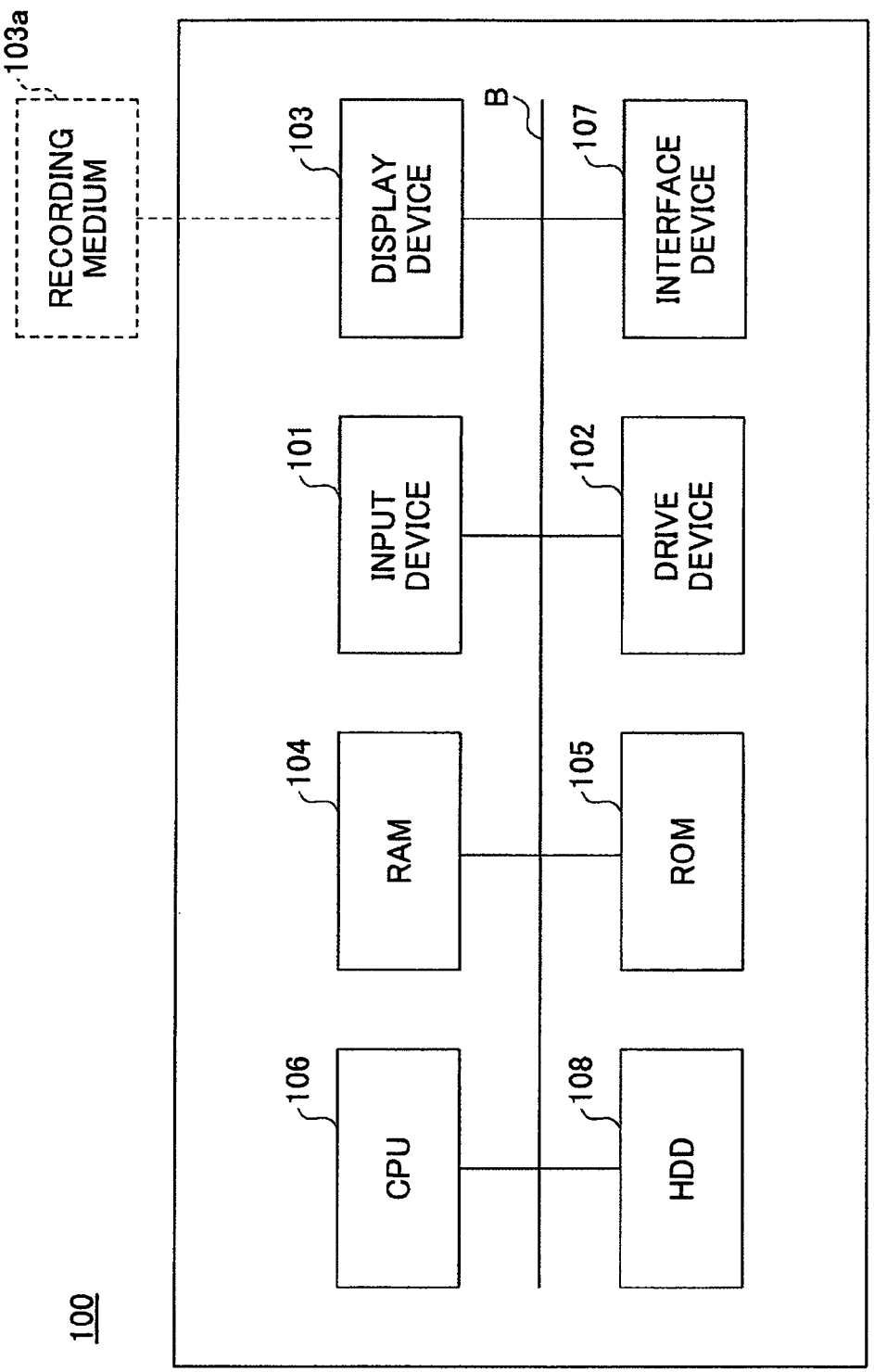
FIG. 1 is a drawing showing an exemplary hardware configuration of an information processing apparatus according to a first embodiment of the present invention.

FIG. 1 shows an exemplary hardware configuration of an information processing apparatus 100 according to the first embodiment of the present invention. As shown in FIG. 1, the information processing apparatus 100 includes an input device 101, a display device 102, a drive device 103, a RAM (Random Access Memory) 104, a ROM (Read Only Memory) 105, a CPU (Central Processing Unit) 106, an interface device 107, and an HDD (Hard Disk Drive) 108. Those elements are connected to each other via a bus B.

The input device 101 may include a keyboard and a mouse, and is used to input various operation signals from a user to the information processing apparatus 100. The display device 102 may include a display to display a result of a process performed by the information processing apparatus 100 and a GUI (Graphical User Interface) menu (e.g., a setting menu for setting color conversion) and the like.

The interface device 107 connects the information processing apparatus 100 with a predetermined data transmission path like a network. Namely, via the interface device 107, the information processing apparatus 100 can perform data communication with an image forming apparatus 200 described below.

The HDD 108 is a non-volatile storage device storing various programs and data. The various programs and the data include, for example, an OS (Operating System) which is a fundamental software such as Widows® or UNIX®, and applications providing various functions (such as document forming/editing functions) in an information processing system. Further, the HDD 108 manages the above stored programs and data by using a predetermined file system and/or a DB (Data Base).

The drive device 103 is an interface with a recording medium 103a. Via the drive device 103, the information processing apparatus 100 can read data from and write data into the recording medium 103a.

The ROM 105 is a non-volatile semiconductor memory (storage device) capable of retaining stored data even when power is turned OFF. The ROM 105 stores a BIOS (Basic Input/Output System) to be executed when the information processing apparatus 100 is booted, system settings of the information processing apparatus 100, and data of network settings and the like.

The RAM 104 is a volatile semiconductor memory (storage device) temporarily storing the programs and data read out from the above various storage devices. The CPU 106 executes the program having been loaded to the RAM 104 to control the entire information processing apparatus 100 and realize the various functions of the information processing apparatus 100.

By having the above hardware configuration, in the information processing apparatus 100, the print data may be generated and transmitted by executing programs of the printer driver and applications by the CPU 106, the programs having been loaded into the RAM 104.

Image Forming Apparatus

Figure 2:
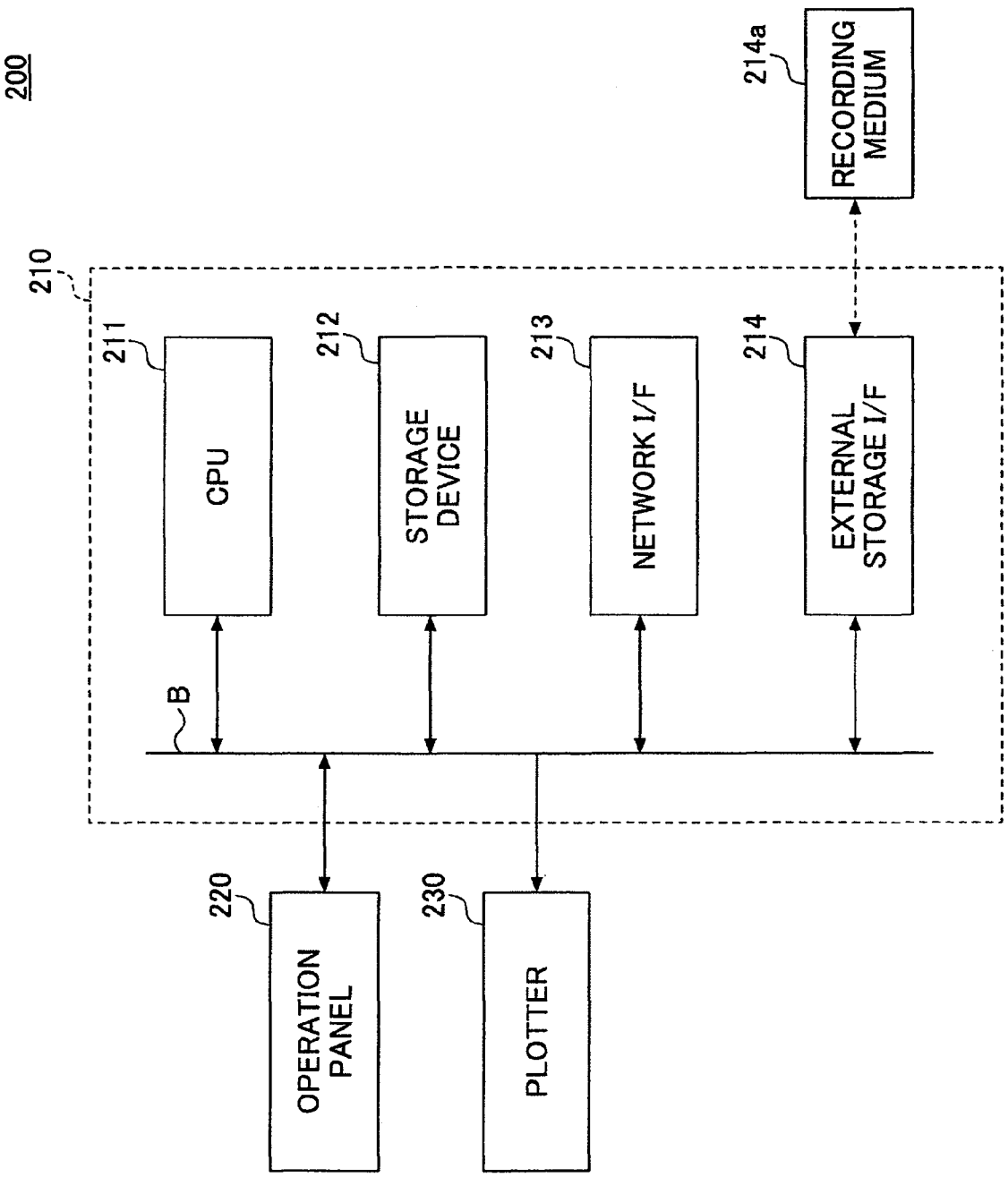
FIG. 2 is a drawing showing an exemplary hardware configuration of an image forming apparatus according to the first embodiment of the present invention.

FIG. 2 shows an exemplary hardware configuration of an image forming apparatus 200 according to the first embodiment of the present invention. As shown in FIG. 2, the image forming apparatus 200 includes a controller 210, an operation panel 220, and a plotter 230. These elements are connected to each other via a bus B.

The operation panel 220 includes a display section and an input section to provide a user with various information such as device information and receive (input) various user's operations such as operation settings and operation instructions. The plotter 230 includes an image forming section to form an output image onto a sheet. As the method of forming the output image, an electrophotographic method or an inkjet method may be used.

As shown in FIG. 2, the controller 210 includes a CPU 211, a storage device 212, a network I/F (interface) 213, and an external storage I/F 214. These elements are connected to each other via the bus B.

The CPU 211 executes programs to perform various functions and control the entire image forming apparatus 200. The storage device 212 stores and retains the programs and various data (e.g., image data). As the storage device 212, for example, a volatile memory such as a RAM, a non-volatile memory such as a ROM, and a large-capacity storage device such as an HDD may be used. The RAM is used as a work area (i.e., a storage area to which the programs and the data are temporarily loaded) of the CPU 211. The ROM and the HDD are used as the storage destination of the programs and the data. By having this configuration, in the image forming apparatus 200, the CPU 211 loads the program from the ROM to the RAM to executes the program.

The network I/F (interface) 213 connects the image forming apparatus 200 with a predetermined data transmission path like a network. The external storage I/F 214 is an interface with a recording medium 214a. As the recording medium 214a, for example, the SD memory card and the USB memory may be used. Via the external storage I/F 214, the image forming apparatus 200 can read data from and write data into the recording medium 214a.

By having the above hardware configuration, in the image forming apparatus 200, for example, by executing a program by the CPU 211, the program having been loaded from the HDD to the RAM, the print data may be received and used to perform an image forming process.

Software Configuration

Next, a configuration of the information processing apparatus 100 and the image forming apparatus 200 is described.

Figure 3:
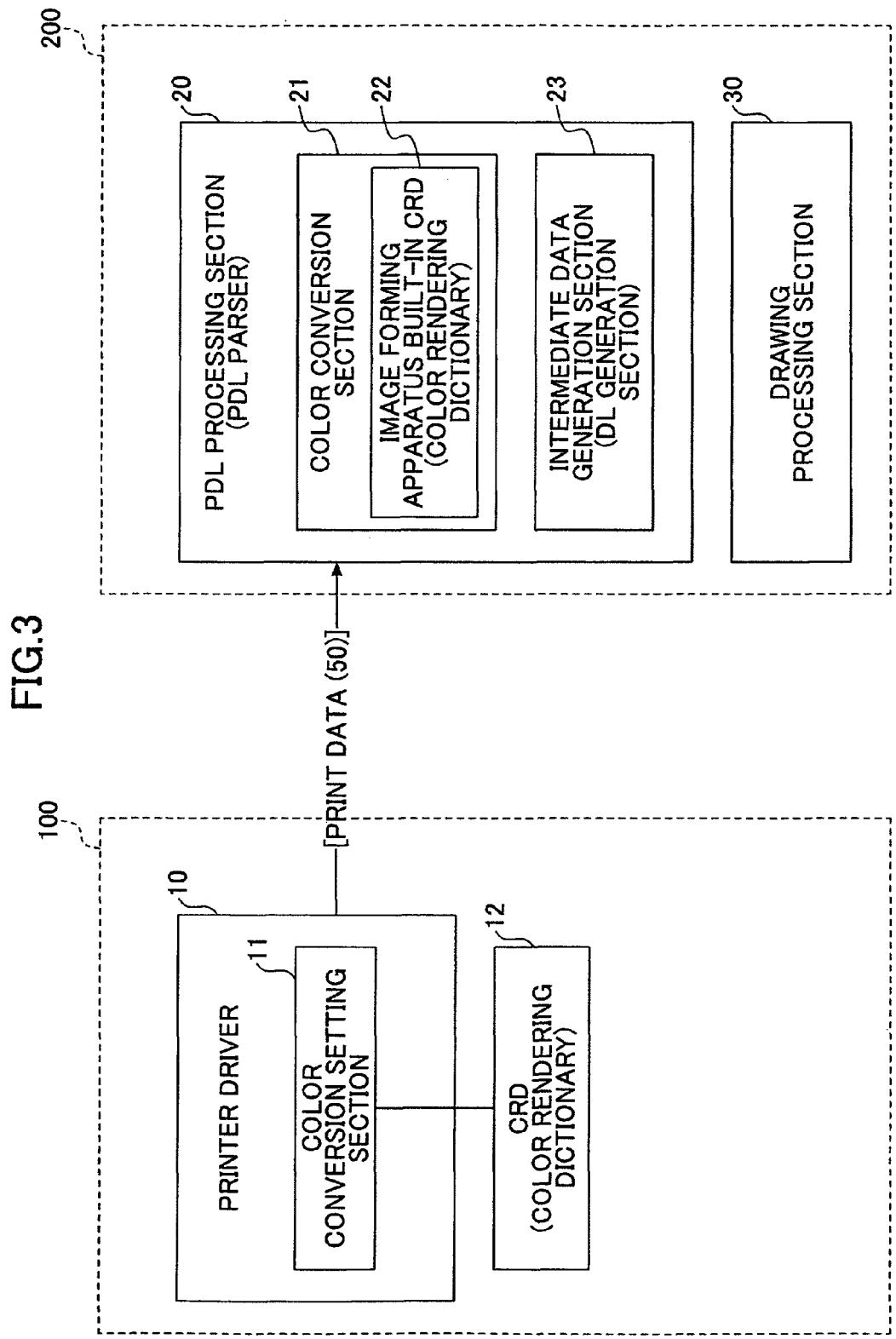
FIG. 3 is a drawing showing an exemplary software configuration of the information processing apparatus and the image forming apparatus according to the first embodiment of the present invention.

FIG. 3 shows an exemplary software configuration of the information processing apparatus 100 and the image forming apparatus 200 according to the first embodiment of the present invention.

Information Processing Apparatus

As shown in FIG. 3, the information processing apparatus 100 includes a printer driver 10 to be used by an application for generating print data 50. In the following, a description is made assuming that the printer driver 10 is Windows®-compatible.

Further, it is possible to install a CRD 12 in the information processing apparatus 100 so as to be used for a color conversion process. The CRD stands for Color Rendering Dictionary which is a color conversion table for converting colors designated in a color space which does not depend on a device (hereinafter "device-independent color space") into colors of the device (i.e., representing colors of the image forming apparatus 200) to which the print data 50 are output. Therefore, the CRD 12 to be installed in the information processing apparatus 100 may be provided by the vender of the image forming apparatus 200. In this case, typically, the CRD 12 is optimized to match the characteristics of the image forming apparatus 200 (i.e., image forming apparatus supported by the printer driver).

The printer driver 10 includes a function section to set printing conditions and a function section to generate the print data 50 in accordance with the printing conditions. The function section to set printing conditions of the printer driver 10 includes a color conversion setting section 11. The color conversion setting section 11 sets conditions for the color conversion process performed by the information processing apparatus 100.

Figure 4:
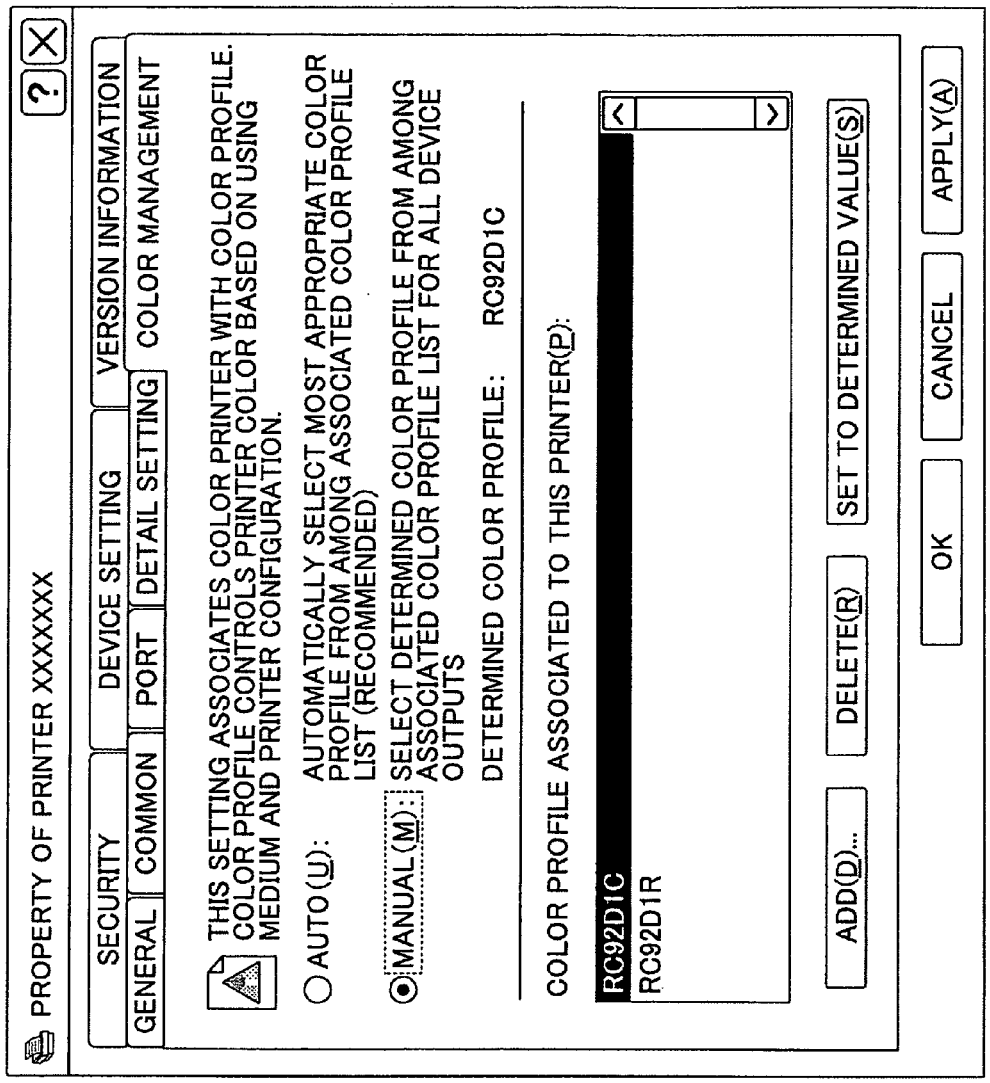
FIG. 4 is a drawing showing an example of the first setting menu of a printer driver according to the first embodiment of the present invention.

FIG. 4 shows an example of a first setting menu of the printer driver 10 according to the first embodiment of the present invention. As indicated in FIG. 4, the color conversion setting section 11 sets the CRD 12 to be used for the color conversion process performed by the information processing apparatus 100 through this first setting menu of the printer driver 10. Upon being installed, the CRD 12 is stored and retained in a predetermined storage destination. By storing in this way, one or more stored CRD data items can be listed as shown in the first setting menu. The first setting menu of FIG. 4 shows a case where two CRD data items are listed, and the CRD data item having the data name "RC92D1C" is selected as the CRD 12 to be used (determined CRD) for the color conversion process performed by the information processing apparatus 100.

Further, through the other setting menus of the printer driver 10, various other printing condition items can be set as described below.

Figure 5:
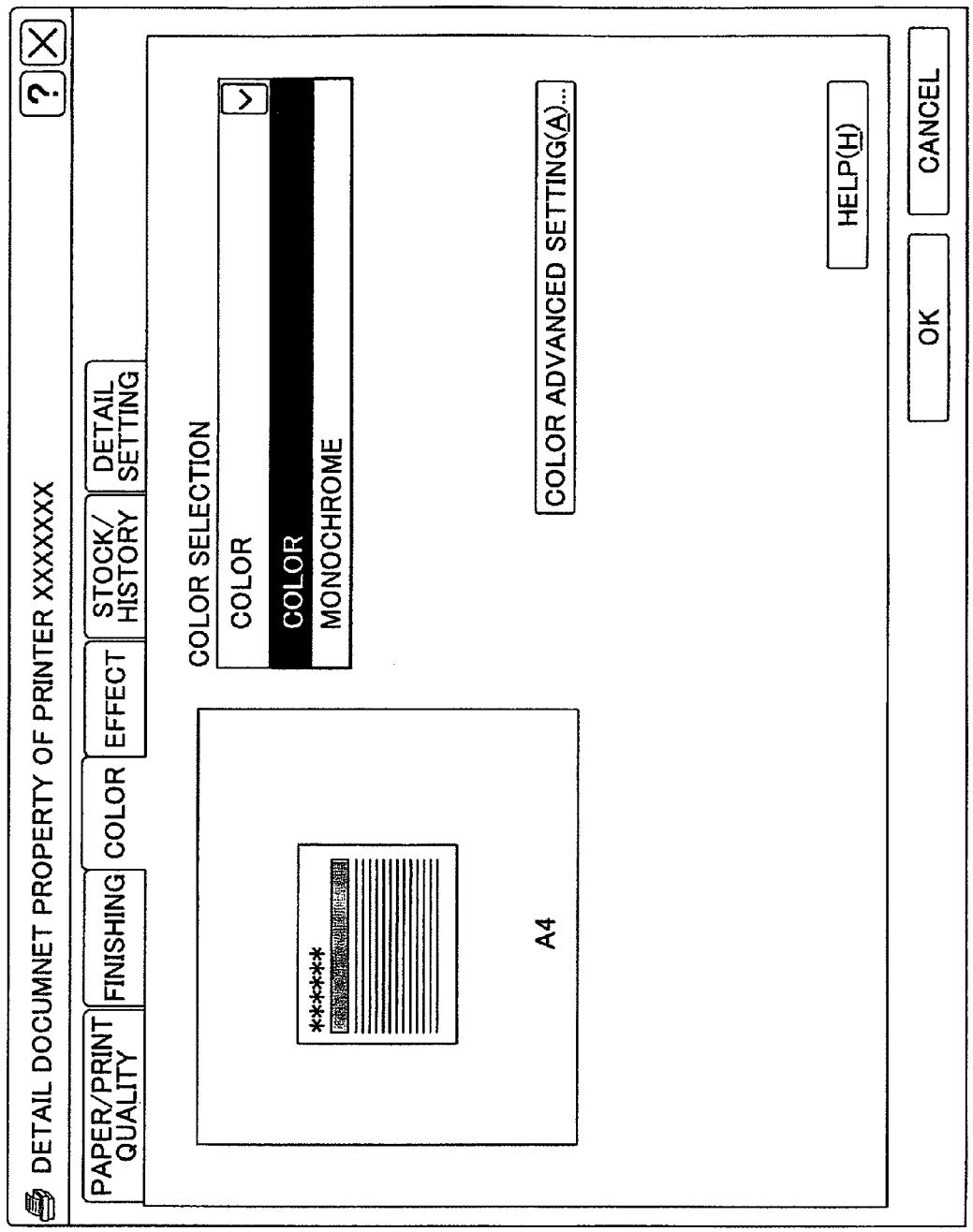
FIG. 5 is a drawing showing an example of the second setting menu of a printer driver according to the first embodiment of the present invention.

FIG. 5 shows an example of a second setting menu of the printer driver 10 according to the first embodiment of the present invention. As indicated in FIG. 5, in this second setting menu of the printer driver 10, it is possible to determine whether the data to be printed is printed in color or monochrome. The second setting menu of FIG. 5 shows a case where "color" printing is selected. Further, in the second setting menu, when the "color" printing is selected, a function button to display advanced settings for color printing (the "color advanced settings" button in FIG. 5) is activated (displayed). The printer driver 10 receives advanced settings for the color printing in the setting menu displayed when this function button (i.e., the "color advanced settings" button) is pressed.

Figure 6:
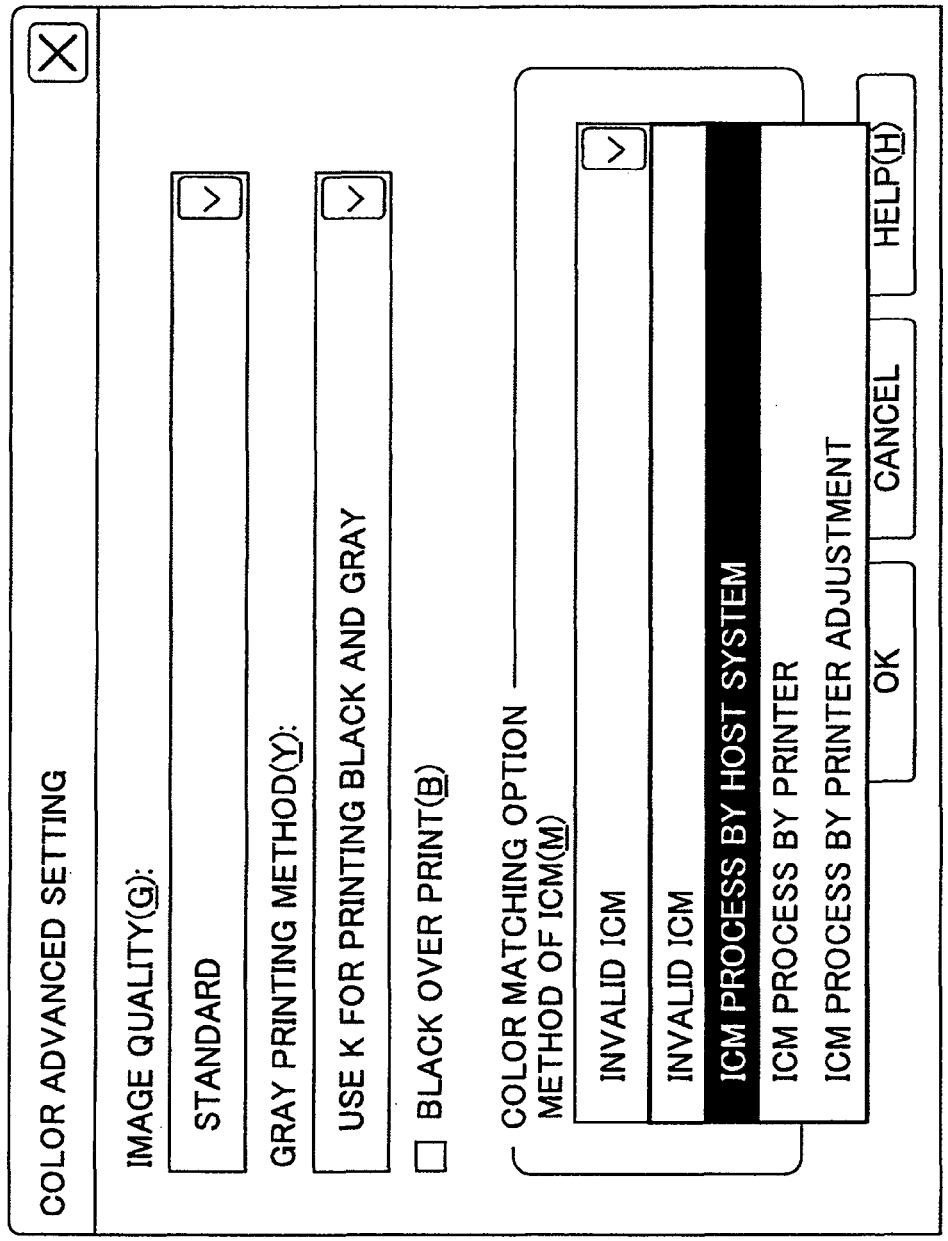
FIGS. 6A and 6B are drawings showing an example of the third setting menu of a printer driver according to the first embodiment of the present invention.

FIGS. 6A and 6B show an example of a third setting menu of the printer driver 10 according to the first embodiment of the present invention. This third setting menu corresponds to the menu for the advanced setting of the color conversion in color printing. As indicated in FIGS. 6A and 6B, in this third setting menu of the printer driver 10, it is possible to determine, for example, the settings of image quality, a type of gray printing method, and a color matching option as the advanced settings of color printing.

In the image quality setting, for example, image quality in color printing may be set from various options from two-tone level to high quality. Further, in the gray printing method setting, it is possible to set which representing color is to be used for black or gray color in color printing. The third setting menu of FIG. 6A shows a case where an item "K is used for black and grey printing" is selected as the gray printing method.

Further, in the color matching, option setting, it is possible to determine which method is to be used for ICM (Image Color Management) in color printing. The ICM is a management system of color information which is compliant with ICC (International Color Consortium) under Windows® OS. The color matching option setting corresponds to the setting performed by the color conversion setting section 11 of the printer driver 10. This setting corresponds to the setting of a color conversion process performed by the information processing apparatus 100 (hereinafter "color conversion setting").

As indicated in FIG. 6A, in the color conversion setting section 11, it is possible to select one of "Invalid ICM", "ICM process by host system", "ICM process by printer", and "ICM process by printer adjustment" as the color conversion process to be performed by the information processing apparatus 100. The third setting menu of FIG. 6A shows a case where the method (item) "ICM process by host system" is selected as the color conversion process to be performed by the information processing apparatus 100.

Further, in the color conversion setting section 11, it is possible to select one purpose of the color conversion process performed by the information processing apparatus 100. Specifically, one purpose of the color conversion process from among, for example, "picture", "graphic", "correction", and "matching" can be selected. The third setting menu of FIG. 6B shows a case where the "picture" is selected as the purpose of the color conversion process ("ICM process by host system" in this case) performed by the information processing apparatus 100.

Based on the result of the advanced settings for the color printing (i.e., the setting of the method and the purpose of the ICM), the printer driver 10 specifies the CRD to be used for the color conversion process and generates the print data 50 including the CRD data.

Figure 7:
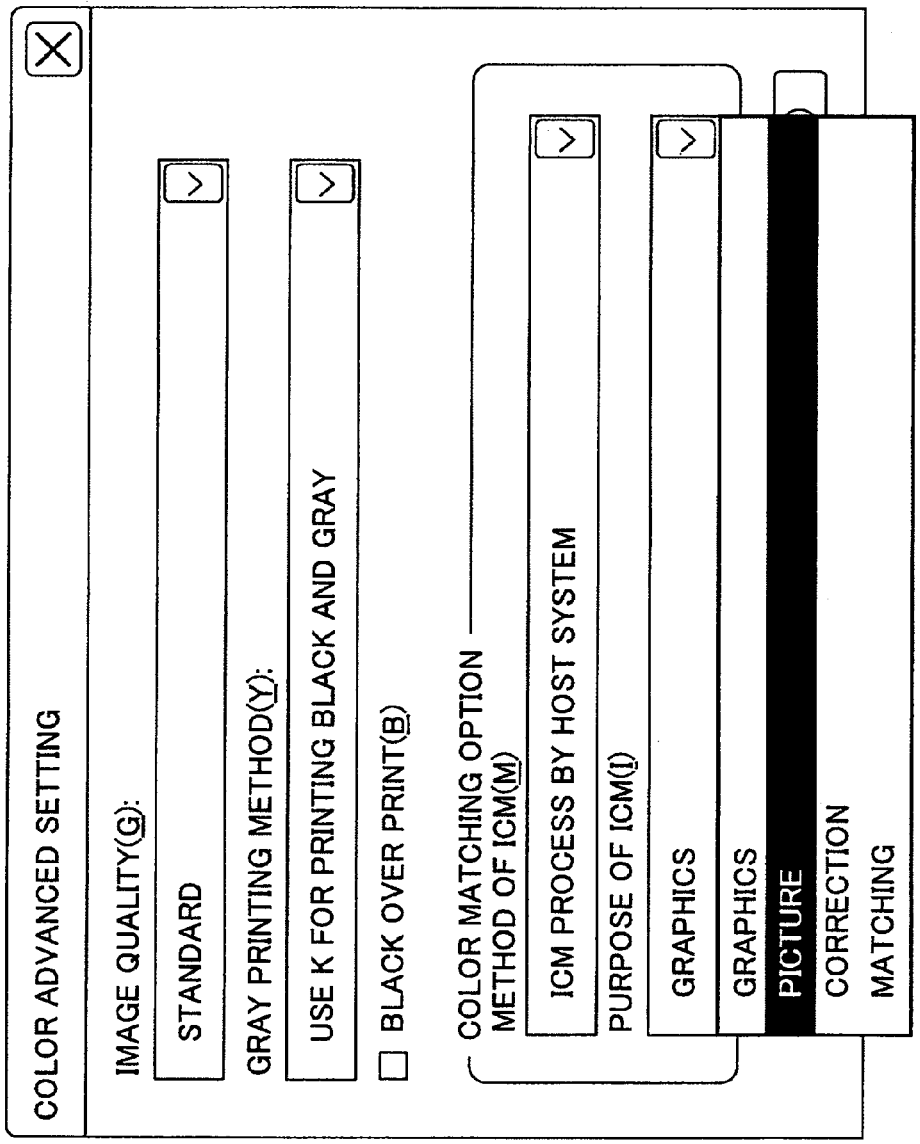
FIG. 7 is drawing showing examples of print data in different color conversion settings according to the first embodiment of the present invention.

FIG. 7 shows an example of print data 50 in each of the color conversion settings according to the first embodiment of the present invention. As indicated in FIG. 7, when "ICM process by host system" is set (selected), the printer driver 10 generates print data 50a having been converted by performing the color conversion process by the information processing apparatus 100. In this case, the CRD 12 having been set (selected) in the first setting menu of FIG. 4 is used in the color conversion process.

Further, when "ICM process by printer" is set (selected), the printer driver 10 generates print data 50b including the CRD data to be used for the color conversion process to be performed by the image forming apparatus 200. Namely, the printer driver 10 generates CRD download data to be transmitted to the image forming apparatus 200. In this case, as the CRD download data, the CRD 12 having been set (selected) in the first setting menu of FIG. 4 is used. Further, the CRD 12 to be used for the color conversion process in the image forming apparatus 200 (CRD to be downloaded) is specified by using a PS operator "setcolorrendering" which is a standard command.

Further, when "ICM process by printer adjustment" is set (selected), the printer driver 10 generates print data 50c including a command to specify (select) an image forming apparatus built-in CRD 22 to be used for the color conversion process to be performed by the image forming apparatus 200. In this case, the image forming apparatus built-in CRD 22 is specified by using the PS operator "setcolorrendering" which is the standard command.

As described above, upon receiving the settings of various items of the color conversion through the above setting menus, the printer driver 10 generates the print data 50 in accordance with the color conversion setting set by the color conversion setting section 11. On the other hand, when "Invalid ICM" is set (selected), the printer driver 10 does not perform the color conversion process in the information processing apparatus 100. Namely, the printer driver 10 generates print data 50 not including data related to the color conversion process (i.e., without color conversion setting data and converted data).

Figure 8:
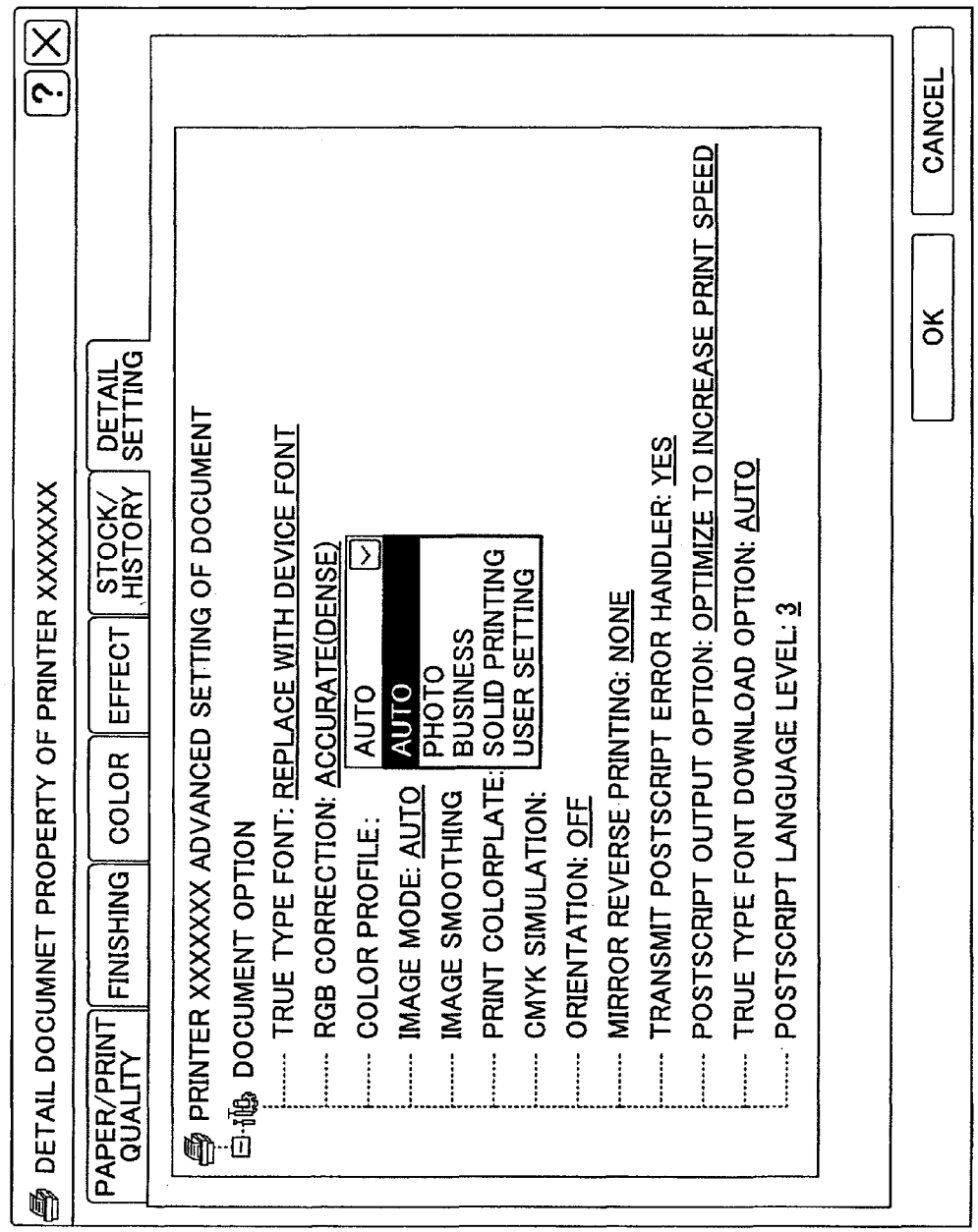
FIG. 8 is a drawing showing an example of the fourth setting menu of a printer driver according to the first embodiment of the present invention.

FIG. 8 shows an example of a fourth setting menu of the printer driver 10 according to the first embodiment of the present invention. As indicated in FIG. 8, in this fourth setting menu of the printer driver 10, it is possible to set (select) the purpose of an extended color conversion process which is performed by the image forming apparatus 200. Specifically, one purpose can be set (selected) from among "Auto", "Photo", "Business", "Solid printing", and "User setting". For example, when "Auto" is set, each optimal color conversion process, is performed for respective objects (e.g., text, graphic, and image) in the print data 50. When "Photo" is set, the color conversion process optimal to an image object is performed. The fourth setting menu of FIG. 8 shows a case where "Auto" is selected as the purpose of the extended color conversion process performed by the image forming apparatus 200.

Herein, the extended color conversion process refers to the color conversion process performed based on the color conversion setting using a vendor's own (vendor-supplied) extended command (hereinafter "extended color conversion setting") by using the image forming apparatus built-in CRD 22 (CRD optimized to the image forming apparatus 200). A detail of the image forming apparatus built-in CRD 22 is described in the part of the software configuration of the image forming apparatus 200 below.

The printer driver 10 generates the print data 50 specifying the selected purpose. In this case, the purpose is specified by using a vendor's own PS operator (extended operator) which is an extended command.

As described above, the information processing apparatus 100 sends a request for printing by transmitting the print data 50 to the image forming apparatus 200, the print data 50 having been generated by the application using the printer driver 10. A detail of the image forming apparatus 200 is described below.

Referring back to FIG. 3, the image forming apparatus 200 includes a PDL (Page Description Language) processing section 20 and a drawing processing section 30. Further, as indicated in FIG. 3, the PDL processing section (PDL parser) 20 includes a color conversion section 21 and an intermediate data generation section 23. The color conversion section 21 includes the image forming apparatus built-in CRD 22.

The PDL processing section (PDL parser) 20 analyzes the print data 50 received from the information processing apparatus 100 (parses the PS operator). Then, the intermediate data generation section 23 generates intermediate data prior to the corresponding raster image (bitmap image). Herein, the intermediate data refer to the display list in which drawing commands are listed so as to effectively perform a drawing process (develop the raster image).

The drawing processing section 30 performs a drawing process by generating the raster image from the intermediate data (display list) generated by the PDL processing section (PDL parser) 20. The generated raster image is transmitted from the controller 210 to the plotter 230 to be printed.

In the meantime, the color conversion process in the image forming apparatus 200 is performed by the color conversion section 21 of the PDL processing section (PDL parser) 20 in a period after the print data 50 are analyzed (parsed) and before the intermediate data are generated.

Figure 9:
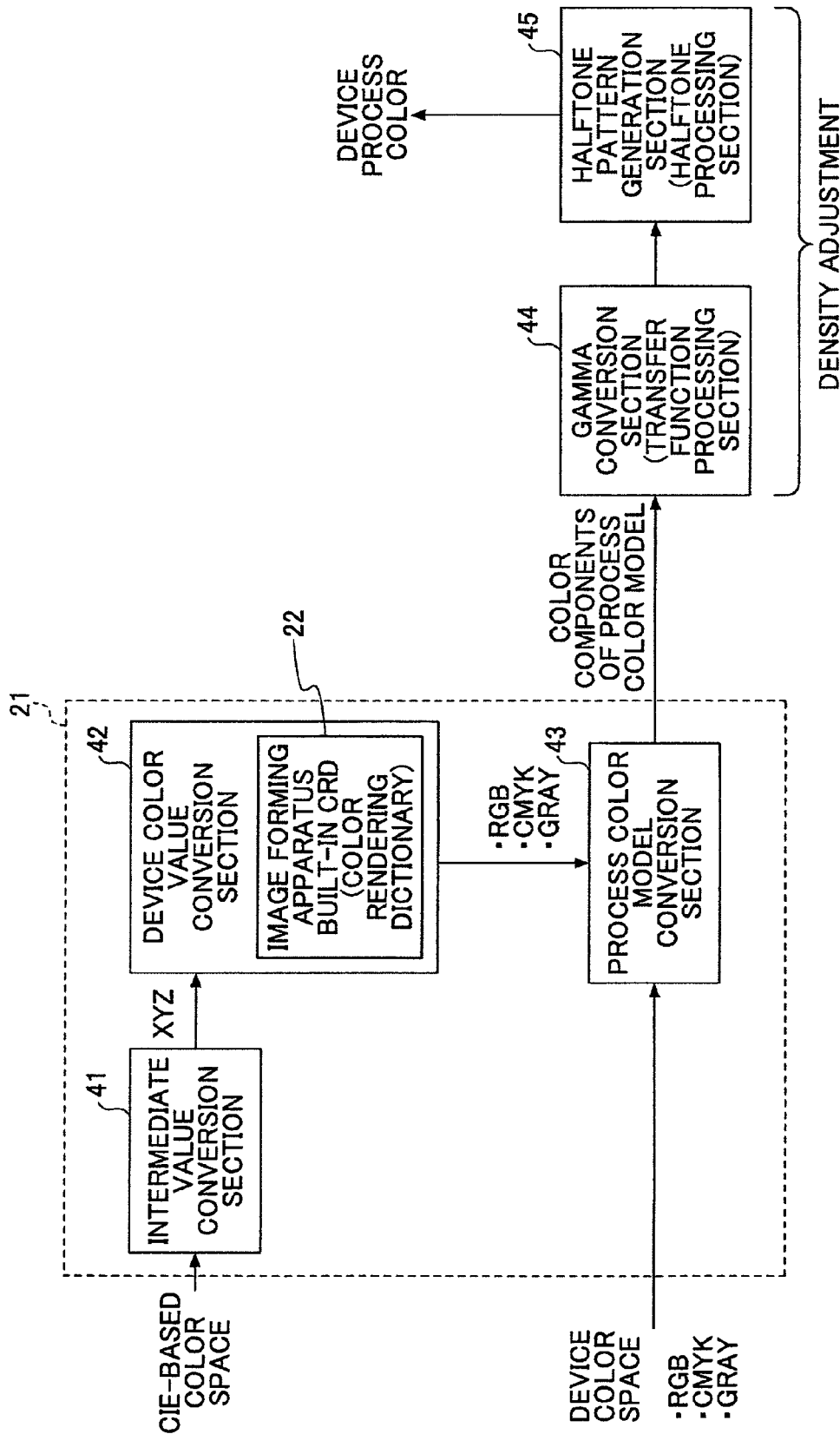
FIG. 9 is a drawing showing an exemplary functional configuration of a color conversion process according to the first embodiment of the present invention.

FIG. 9 shows an exemplary functional configuration of the color conversion process according to the first embodiment of the present invention. In PS (PostScript®) terms, the color conversion process is called "color management", which is described in detail in the PostScript Language Specification (see Adobe's "PostScript Reference Manual"). As illustrated in FIG. 9, the color conversion section 21 includes an intermediate value conversion section 41, a device color value conversion section 42, and a process color model conversion section 43. The image forming apparatus built-in CRD 22 is included in the device color value conversion section 42.

As indicated in FIG. 9, in the color conversion section 21, different plural color spaces may be designated as the input values. This different plural color spaces include a device-independent color space and a color space dependent on a device (hereinafter "device-dependent color space"). The device-independent color space refers to a CIE-based color space (i.e., a color space based on a display color system defined by CIE (Commission Internationale d'Eclairage)). On the other hand, the device-dependent color space refers to RGB, CMYK, Gray or the like.

When a color value designated in the device-independent color space is input, the intermediate value conversion section 41 of the color conversion section 21 converts the color value into an XYZ value (CIE-based XYZ display color system) (an intermediate value).

Next, the device color value conversion section 42 of the color conversion section 21 converts the intermediate value into a device-color value (e.g., RGB value, CMYK value, Gray value) by using the image forming apparatus built-in CRD 22. The image forming apparatus built-in CRD 22 refers to a CIE-based Color Rendering Dictionary (CRD) which is a color conversion table for converting the color value designated in the device-independent color space to the device-color value. Further, the image forming apparatus built-in CRD 22 may be optimized by the vendor of the image forming apparatus 200 in accordance with the input/output characteristics of the image forming apparatus 200.

By doing in this way, the device-independent color space is converted into the device-dependent color space. On the other hand, when a device color designated in the device-dependent color space is input, both of the intermediate value conversion section 41 the device color value conversion section 42 of the color conversion section 21 do not perform the color conversion processes.

Further, the process color model conversion section 43 of the color conversion section 21 converts the device-color value transmitted from the device color value conversion section 42 or the color value designated in the device-dependent color space into a process color model of the device. For example, the process color model refers to a CMYK color model. Therefore, in this case, the process color model conversion section 43 converts the input color value into CMYK color components.

As described above, the color conversion section 21 converts the input color value (device-dependent color value and the device-independent color value) into the CMYK color components (display colors of the image forming apparatus 200).

As illustrated in FIG. 9, the image forming apparatus 200 further includes a gamma conversion section 44 and a halftone pattern generation section 45 disposed on the downstream side of the color conversion section 21. In the image forming apparatus 200, the density of the CMYK color components obtained from the color conversion section 21 is adjusted by the gamma conversion section 44 and the halftone pattern generation section 45.

More specifically, the gamma conversion section (i.e., transfer function processing section) 44 adjusts the gamma of the CMYK color component values. In this case, the gamma conversion section (transfer function processing section) 44 performs the gamma adjustment by using a transfer function designed in accordance with the output characteristics of the image forming apparatus 200. Namely, when the CMYK color component values are input to this transfer function, the gamma adjusted values are output. Further, based on the gamma adjusted values, the halftone pattern generation section (i.e., halftone processing section) 45 generates a halftone pattern for CMYK color components. The halftone pattern may also be called halftone dot pattern and is a pattern representing (depicting) an image using small dots of a limited number of colors.

As described above, when the image forming apparatus 200 receives the print data 50 from the information processing apparatus 100, the PDL processing section (PDL parser) 20 performs the intermediate data generation process and the color conversion process, and the density adjustment process is performed. Then, the drawing processing section 30 generates the raster image to be color-printed on a sheet.

In the meantime, when the image forming apparatus 200 receives the print data 50 having been generated based on the method of "ICM process by printer" or the "ICM process by printer adjustment" as the color conversion setting, the device color value conversion section 42 of the color conversion section 21 performs the following color conversion process. In this case, the PDL processing section (PDL parser) 20 analyzes (parses) the print data 50, and interprets the standard command of the PS operator "setcolorrendering".

When the image forming apparatus 200 receives the print data 50 generated by using the "ICM process by printer" as the color conversion setting, the device color value conversion section 42 converts the intermediate value into the device-color value by using the CRD that is designated by the standard command and that is included in the print data 50 (downloaded CRD).

On the other hand, when the image forming apparatus 200 receives the print data 50 generated by using "ICM process by printer adjustment" as the color conversion setting, the device color value conversion section 42 converts the intermediate value into the device-color value by using the image forming apparatus built-in CRD 22 designated by the standard command in the print data 50.

When the image forming apparatus 200 receives the print data 50 generated by using "ICM process by host system" as the color conversion setting, the device color value conversion section 42 of the color conversion section 21 performs the following color conversion process.

As described above, the color conversion process has been already performed on the print data 50 generated by using "ICM process by host system" as the color conversion setting when the image forming apparatus 200 receives the print data 50. Because of this feature, the device-dependent color values (RGB values) are input to the color conversion section 21. In this case, the input color values are converted into color values of a different CIE-based color space (called UseCIE-Color). After this conversion, the same color conversion process is performed as that performed when the image forming apparatus 200 receives the print data 50 based on the method of "ICM process by printer" or "ICM process by printer adjustment" as the color conversion setting (namely, the same process is performed in the same color path).

In the image forming apparatus 200, when the print data 50 are analyzed and the vendor's own PS operator (extended command) is parsed, the device color value conversion section 42 of the color conversion section 21 performs the following color conversion process.

When the image forming apparatus 200 receives the print data 50 in which the color conversion is set by the extended command, the device color value conversion section 42 converts the intermediate value into the device color value by using the corresponding image forming apparatus built-in CRD 22 based on the specified (selected) purpose of the extended color conversion process.

Color Conversion Control Function

Next, a color conversion control function according to the first embodiment of the present invention is described.

In the image forming apparatus 200 according to the first embodiment of the present invention, whether a valid color conversion setting has been performed by the information processing apparatus 100 is determined based on the received print data 50. Based on the result of the determination, the image forming apparatus 200 controls (selects) the color conversion process to be performed by the image forming apparatus 200. Specifically, when determining that no valid color conversion setting has been performed (set) by the information processing apparatus 100, the image forming apparatus 200 performs the color conversion process by using the extended command (i.e., the extended color conversion process). On the other hand, when determining that a valid color conversion setting has been performed (set) by the information processing apparatus 100, the image forming apparatus 200 performs a process in accordance with the color conversion setting performed by the information processing apparatus 100 (hereinafter "standard color conversion process"). The image forming apparatus 200 has such a color conversion control (selecting) function as described above. The color conversion control function is performed (possessed) by the device color value conversion section 42 of the color conversion section 21.

For example, as indicated in FIGS. 6A, 6B, and 8, generally, the setting menu (UI menu) of the information processing apparatus 100 may be different from that of the image forming apparatus 200. In addition, no exclusive processing (exclusive control) is performed for the color conversion settings set through those setting menus. Because of this feature, there may be a case where the printer driver 10 generates print data 50 in which plural color conversion settings having an exclusive relationship with each other are mixed together as a wrong setting (i.e., plural color conversion settings set by the standard command and the extended command). Further, in a general image forming apparatus, there may be a case where a vendor's own color conversion setting (i.e., color conversion setting set by the extended command) is set as the default setting of the color conversion process to be performed by the image forming apparatus.

For example, when "ICM process by printer" or "ICM process by printer adjustment" is set as the color conversion setting by the information processing apparatus 100 and the print data 50 includes plural types of commands, the image forming apparatus 200 may neglect the color conversion setting set by the standard command and perform the extended color conversion process which is the process in accordance with the color conversion setting set by the extended command (i.e., the extended color conversion setting).

Further, for example, when "ICM process by host system" is set as the color conversion setting by the information processing apparatus 100, the image forming apparatus 200 may further perform the extended color conversion process on the data on which the color conversion process has been performed by the information processing apparatus 100. As a result, the color conversion process are performed (wrongly) twice.

Because of these features, it is assumed that a user may have to sufficiently understand the color conversion process and the characteristics of the color conversion settings to obtain a desired print result (high-quality print result), and the user has to determine and set the optimal settings by himself/herself. Namely, it is not easy for the user to obtain the desired print result, because it is not easy for the user to determine and set the optimal settings.

According to the first embodiment of the present invention, the image forming apparatuses 200 is controlled in a manner such that a higher priority is placed on the process based on the color conversion setting of the information processing apparatus 100 than on the extended color conversion process of the image forming apparatuses 200.

By doing in this way, even when plural color conversions can be performed by using plural types of commands including the standard command and the extended command and the information processing apparatus 100 and the image forming apparatuses 200 can perform the respective color conversion processes, the user may not have to perform complicated color conversion settings. Namely in this case, the user may obtain the desired print result easily.

In the following, a configuration and an operation of the color conversion control function is described.

Figure 10:
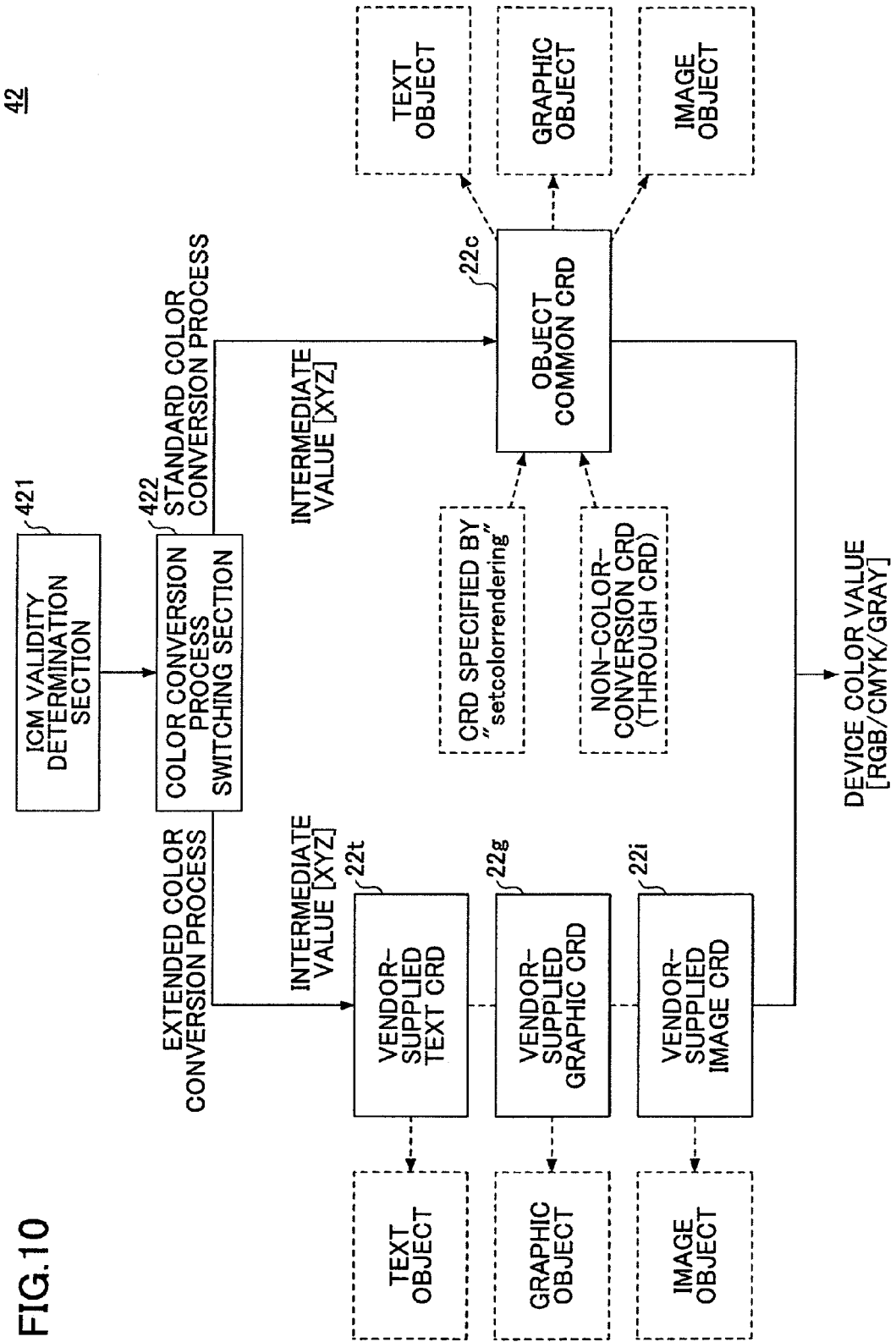
FIG. 10 is a drawing showing an exemplary functional configuration of a color conversion control according to the first embodiment of the present invention.

FIG. 10 illustrates an exemplary functional configuration of the color conversion control according to the first embodiment of the present invention.

As illustrated in FIG. 10, the device color value conversion section 42 includes an ICM validity determination section 421 and a color conversion process switching section 422.

The ICM validity determination section 421 is a function section determining whether a valid ICM process has been set in the print data 50 (determination unit).

For example, the ICM validity determination section 421 determines by using the following method. First, when the print data 50 is input to the image forming apparatuses 200, the print data 50 is analyzed by the PDL processing section (PDL parser) 20. In this analysis, the PS operator (PDL command of the standard command and/or the extended command) is interpreted (parsed). By doing in this way, the ICM validity determination section 421 determines whether a valid ICM process has been set based on the interpretation result (parse result) of the PS operator.

For example, when the ICM process is set by a predetermined PS operator (e.g., a PDL command like "setcontrolrendering"), the ICM validity determination section 421 determines based on the interpretation result of the predetermined PS operator (PS command). Further, ICM validity determination section 421 may determine based on a predetermined data pattern in the print data 50. In the print data 50, when such specific command (as "setcontrolrendering") is not used, the ICM process may be set in specific PS data (e.g., "CRD download data" or "data after color conversion") as indicated in FIG. 7. Therefore, the ICM validity determination section 421 may determine whether a valid ICM process has been set based on the interpretation result of the specific PS data in the print data 50.

By doing in this way, the ICM validity determination section 421 determines whether a valid ICM process has been set in the information processing apparatus 100 based on the received print data 50.

Based on the determination result by the ICM validity determination section 421, the color conversion process switching section 422 is a function section controlling to switch between the "standard color conversion process" and the "extended color conversion process" performed by the image forming apparatus 200 (control unit having a switching means). The extended color conversion process is the color conversion process performed in accordance with the color conversion setting set by the extended command (extended color conversion setting).

In the extended color conversion process, each optimal color conversion process is performed for the respective objects such as text, graphic, and image. Because of this feature, the image forming apparatus built-in CRD 22 to be used for the extended color conversion process is supplied by the vendor for each of the objects.

For example, in the extended color conversion process, a vender-supplied text CRD 22t is used for a text object of a document to be printed; a vender-supplied graphic CRD 22g is used for a graphic object; and a vender-supplied image CRD 22i is used for an image object. By separately using those CRDs, the intermediate values are converted into color values of the device-dependent color space for the objects.

On the other hand, the standard color conversion process is the color conversion process performed in accordance with the color conversion setting set by the standard command.

In the standard color conversion process, a common color conversion process is performed for each object. Namely, the download CRD designated by the standard command or the image forming apparatus built-in CRD 22 is used for each object. In other words, the download CRD designated by the standard command or the image forming apparatus built-in CRD 22 is used as an object common CRD 22c.

Further, in the image forming apparatus 200, in default setting, a non-color-conversion CRD (Through CRD) is set as the object common CRD 22c to be used until another CRD is designated by the standard command. The non-color-conversion CRD (a Through CRD) refers to a conversion table where the input color value and the output color value are the same as each other (the color value is not changed between input and output). The non-color-conversion CRD (Through CRD) is required to be used to avoid performing the color conversion processes (wrongly) twice, which may become a problem upon receiving the print data 50 generated by using "ICM process by host system" as the color conversion setting.

In the standard color conversion process, when the color conversion setting set by the standard command is included in the print data 50, the color conversion is performed by replacing the CRD to be used for the color conversion process from the non-color-conversion CRD (Through CRD) to the object common CRD 22c designated by the standard command.

Therefore, the color conversion process switching section 422 performs the following switching (selecting) control. For example, when the ICM validity determination section 421 determines that no valid conversion setting has been set (made) in the information processing apparatus 100, the color conversion process switching section 422 controls to perform the extended color conversion process of the image forming apparatus 200. On the other hand, when the ICM validity determination section 421 determines that a valid conversion setting has been set (made) in the information processing apparatus 100, the color conversion process switching section 422 controls to perform the standard color conversion process in accordance with the color conversion setting set in the information processing apparatus 100.

The extended color conversion process is the color conversion process optimized by the vendor in accordance with the input/output characteristics of the image forming apparatus 200. Because of this feature, when the color conversion setting has not been performed in the information processing apparatus 100, the extended color conversion process is performed. However, in a case where the color conversion setting has been performed in the information processing apparatus 100, even though the standard command and the extended command are mixed in the print data 50 or the extended color conversion process is set as the default condition, the image forming apparatus 200 is controlled in a manner such that a higher priority is placed on the user settings. In other words, in this case, the image forming apparatus 200 is controlled in a manner such that a higher priority is placed on the process in accordance with the color conversion setting in the information processing apparatus 100 (i.e., the standard color conversion process) than on the extended color conversion process of the image forming apparatus 200.

As described above, the color conversion process switching section 422 controls (determines) the color conversion setting to be performed in the image forming apparatus 200 based on the determination result whether a valid color conversion setting has been set (made) in the information processing apparatus 100.

The color conversion control function according to the first embodiment of the present invention is realized by operating the above function sections together.

Next, detail operations (coordinated operations of the function sections) of the color conversion control function and the procedure thereof are described with reference to FIG. 11.

The color conversion control function is realized when, for example, a PDL program (PS parser program) installed in the image forming apparatus 200 is loaded from the storage destination (e.g., "ROM") to the RAM by the CPU 211 and the following process is executed.

Figure 11:
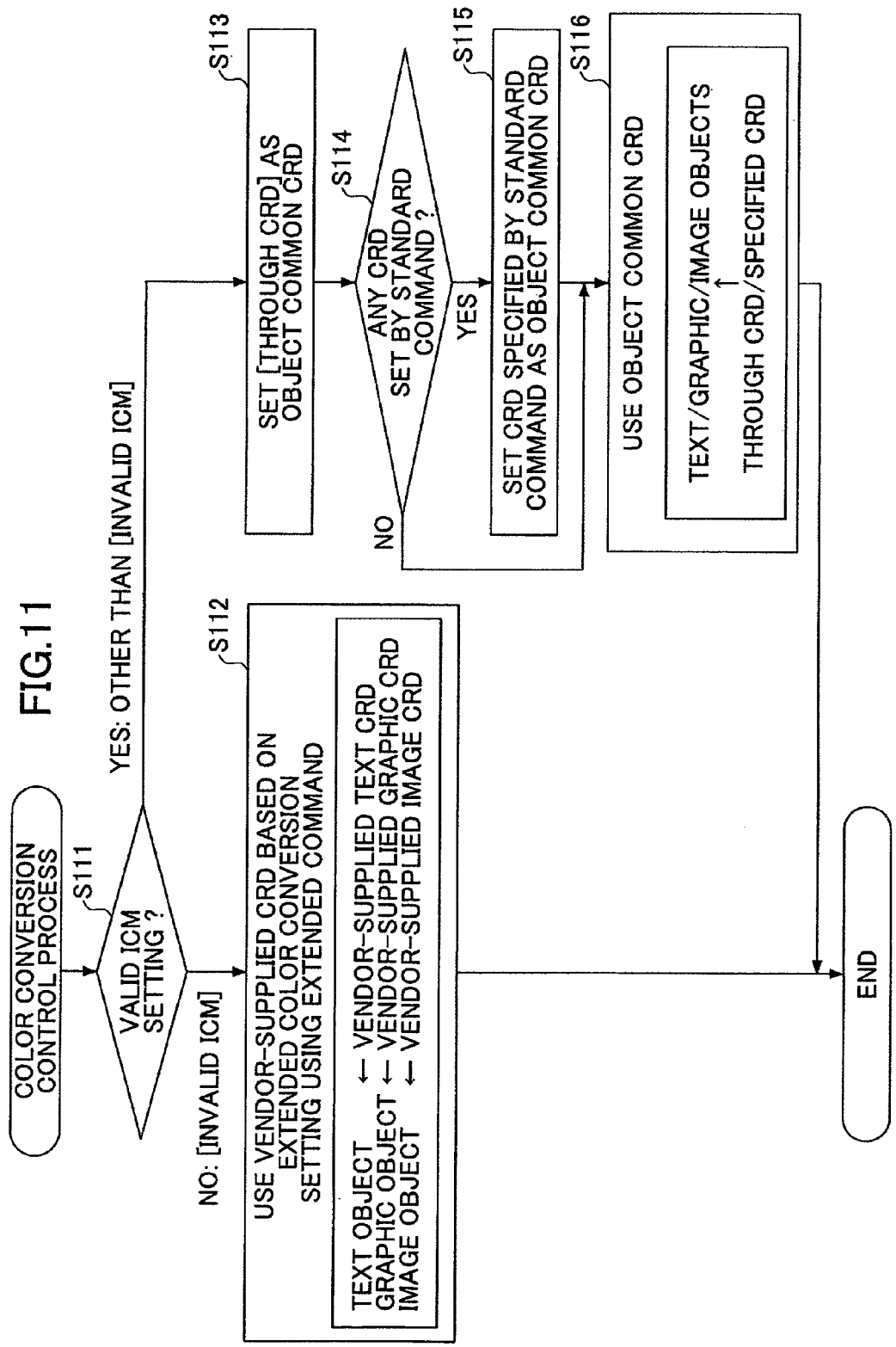
FIG. 11 is a flowchart showing a control process of the color conversion process according to the first embodiment of the present invention.

FIG. 11 is a flowchart showing an exemplary processing procedure of controlling the color conversion process according to the first embodiment of the present invention. The color conversion control function is performed by the device color value conversion section 42 of the color conversion section 21. Therefore, a procedure of the color conversion process of the device-independent color value input as the analysis result of the received print data 50 is described.

As illustrated in FIG. 11, first, the ICM validity determination section 421 of the image forming apparatus 200 determines whether a valid conversion setting has been set in the print data 50 based on the interpretation (analysis) result of the PS operator (step S111).

When the ICM validity determination section 421 determines that no valid conversion setting has been set in the print data 50 (NO in Step S111, [Invalid ICM]), the color conversion process switching section 422 of the image forming apparatus 200 selects the extended color conversion process as the color conversion process to be performed in the image forming apparatus 200 (the process goes to step S112).

In the extended color conversion process, based on the extended color conversion setting by the extended command, the image forming apparatus built-in CRD 22 is used for the objects. More specifically, as described above, the vender-supplied text CRD 22t, the vender-supplied graphic CRD 22g, and the vender-supplied image CRD 22i are used for the text, graphic, and image objects of the document to be printed, respectively (step S112).

On the other hand, when the ICM validity determination section 421 determines that a valid conversion setting has been set in the print data 50 (YES in Step S111, "other than [Invalid ICM]"), the color conversion process switching section 422 selects the standard color conversion process as the color conversion process to be performed in the image forming apparatus 200 (the process goes to step S113).

In the standard color conversion process, first, the non-color-conversion CRD (Through CRD) is set as the object common CRD 22c (step S113). Next, based on the interpretation result of the PS operator, it is determined whether any CRD to be used in the color conversion process is specified by using the standard command (e.g., the PS operator "setcolorrendering") (step S114).

When determining that there is a CRD specified by using the standard command (YES in step S114), the process goes to step S115. In step S115, the specified CRD (typically, the CRD data in the print data 50 or the image forming apparatus built-in CRD 22) is set as the object common CRD 22c. Then, the process goes to step S116.

On the other hand, in step S114, when determining that there is no CRD specified by the standard command (NO in step S114), the process directly goes to step S116.

In step S116, the object common CRD 22c set in Step S114 or S115 is used for each of the objects.

As described above, in the image forming apparatus 200 according to the first embodiment of the present invention, based on the received print data 50, it is determined whether a valid color conversion setting has been set (made) in the information processing apparatus 100. Based on the determination result, the image forming apparatus 200 controls to select either the extended color conversion process or the standard color conversion process as the conversion process to be performed in the image forming apparatus 200.

By controlling in this way, it may become possible for the image forming apparatus 200 to put a higher priority on the process in accordance with the color conversion process of the information processing apparatus 100 (i.e., the standard color conversion process) than on the extended color conversion process of the image forming apparatus 200. As a result, even in a case where the color conversion settings can be set by using plural kinds of commands including the standard command and the extended command and the color conversion process can be performed in both information processing apparatus 100 generating the print data 50 and the image forming apparatus 200 processing the generated print data 50, it may become possible to obtain a desired print result easily.

SECOND EMBODIMENT

In the first embodiment of the present invention, a function of controlling the color conversion process to be performed in the image forming apparatus 200 is described (proposed). In a second embodiment of the present invention, a configuration of the information processing apparatus 100 corresponding to (supporting) the first embodiment is described (proposed). In the description of the second embodiment, the same reference numerals are used for the same or equivalent components in the first embodiment, and repeated description thereof may be omitted.

Figure 12:
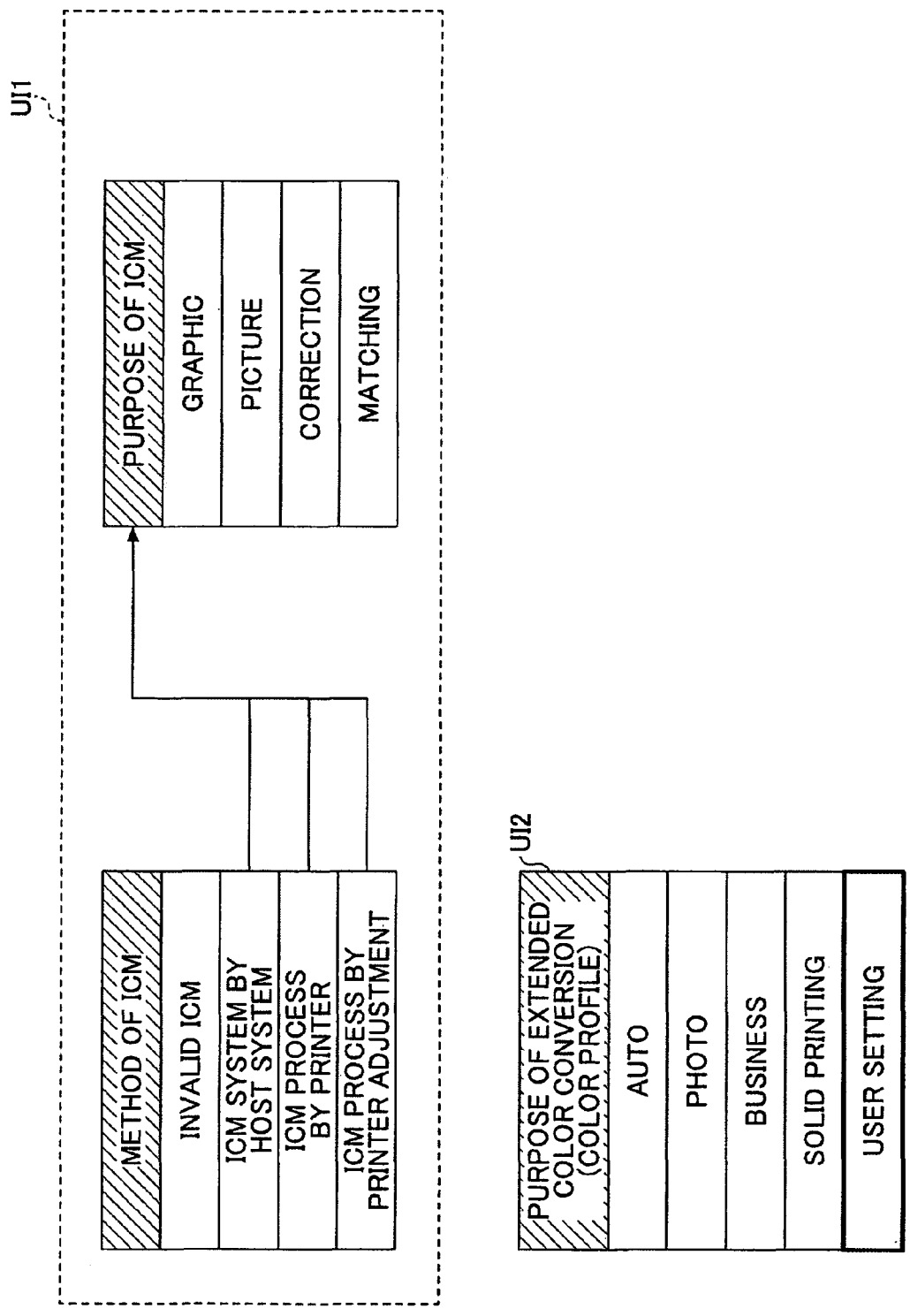
FIG. 12 is a drawing showing a conventional configuration of UI (User Interface) menus for color conversion settings.

FIG. 12 shows an example of conventional UI menus to be used for the color conversion process. As illustrated in FIG. 12, the conventional UI menus for the color conversion process provided by the printer driver 10 is generally separated into two different UI menus: a UI1 menu for setting the method and the purpose of the ICM and a UI2 menu for setting the purpose of the extended color conversion.

It may be preferable that the settings of the extended color process to be performed in the image forming apparatus 200 is activated (displayed) when a user did not set the color conversion process in the information processing apparatus 100. In other words, preferably, the setting of the extended color process is activated (displayed) when the color conversion setting in the information processing apparatus 100 is determined as "Invalid ICM" (in step S111).

However, the color conversion settings settable in conventional UI1 and UI2 menus (in FIG. 12) are configured to be set independently from each other, and no exclusive processing (exclusive control) is performed for the color conversion settings set through those setting menus. Herein, the exclusive processing refers to, for example, a process in which, when "other than "Invalid ICM"" is set through the UI1 menu, setting of the extended color conversion setting is prevented through the UI2 menu.

Because of the deficiency of the conventional UI menus, to obtain a desired print result, a user may have to appropriately set both the color conversion setting to be performed by the information processing apparatus 100 and the extended color conversion setting to be performed by the image forming apparatus 200.

Figure 13:
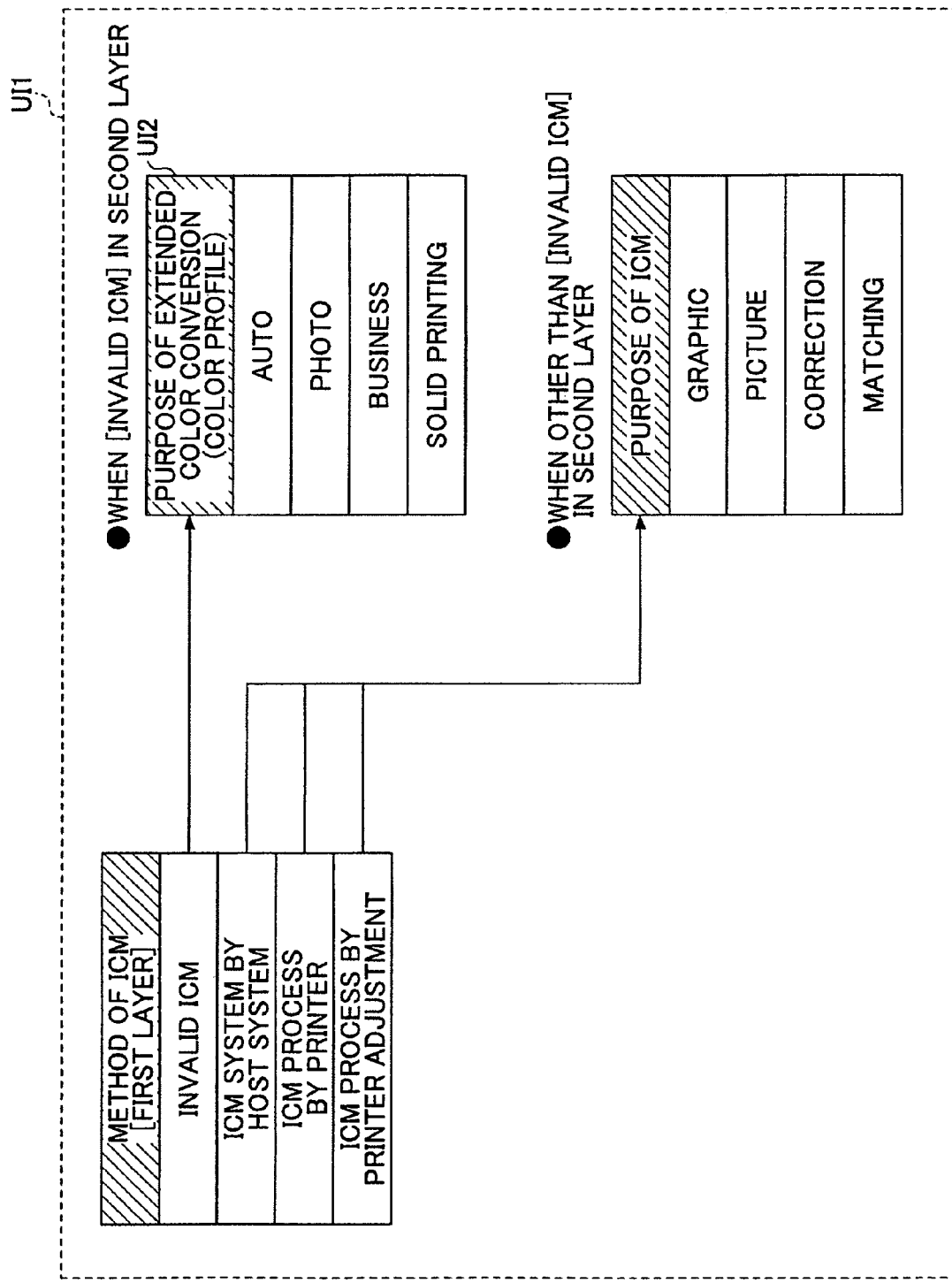
FIG. 13 is a drawing showing an exemplary configuration of the UI menus for the color conversion settings according to a second embodiment of the present invention.

Therefore, according to the second embodiment of the present invention, the exclusive process (exclusive control) in the color conversion settings by configuring the UI1 menu as illustrated in FIG. 13 is proposed.

FIG. 13 shows an exemplary configuration of the UI menu for the color conversion settings according to the second embodiment of the present invention.

According to this embodiment, as illustrated in FIG. 13, the items of the color conversion settings ("color conversion setting item(s)") have a layered configuration, so that the items may be set under the exclusive control.

More specifically, in the UI1 menu according to the second embodiment of the present invention, the color conversion setting items are classified into two layers in which the setting item "method of ICM" is in the first layer and the setting items "purpose of ICM" and "purpose of extended color conversion" are in the second layer.

The printer driver 10 performs the following exclusive control in the above UI1 menu configuration.

When "Invalid ICM" is set (selected) in the setting item "method of ICM" in the first layer of the menu UI1, the setting item "purpose of extended color conversion" in the second layer is set usable (activated). By doing in this way, in the printer driver 10, it may become possible to set the setting item "purpose of extended color conversion" only when "Invalid ICM" is set (selected) as the color conversion setting.

On the other hand, when an item other than "Invalid ICM" is set (selected) in the setting item "method of ICM" in the first layer, the setting item "purpose of ICM" in the second layer is set usable (activated). In this case, the setting item "purpose of extended color conversion" in the second layer is set unusable (deactivated). By doing in this way, in the printer driver 10, it may become possible to prevent setting the setting item "purpose of extended color conversion" when an item other than "Invalid ICM" is set (selected) as the color conversion setting.

The exclusive process (exclusive control) is realized when, for example, a program of the printer driver 10 installed in the information processing apparatus 100 is loaded from the storage destination (e.g., "HDD") to the RAM 104 by the CPU 106 and executed.

As described above, in the information processing apparatus 100 according to the second embodiment of the present invention, by using the printer driver 10, it may become possible to display a UI menu having a layered configuration and perform the exclusive process (exclusive control) of the color conversion settings.

By having the configuration as described above, a user may not be required to operate complicated settings in the information processing apparatus 100 to obtain a desired print result (high-quality print result). As a result, it may become possible to provide a printing environment which allows a user to obtain the desired print result easily.

Further, in the information processing apparatus 100, it possible to prevent a user from setting a wrong setting of the color conversion. As a result, it may become possible to provide a desired print result to the user.

The present invention is described above by referring to specific embodiments. The "color conversion control function" of the image forming apparatus 200 according to the first embodiment of the present invention may be realized based on the processing procedures described with reference to FIG. 11 by the CPU 211 executing a program, the program having been coded using a programming language in conformity with the operating environment (platform) thereof.

The program may be stored in the computer-readable recording medium 214a. As the recording medium 214a, an SD memory card, a USB memory or the like may be used.

In this case, by storing the program in the recording medium 214a, the program may be installed in the image forming apparatus 200 via the external storage I/F 214 that can read the recording medium 214a. Further, as described above, the image forming apparatus 200 may include the network I/F (interface) 213. In this case, the program may be downloaded and installed in the image forming apparatus 200 via an electronic communication line like the Internet.

Further, the "display of the UI menus having a layered configuration and exclusive process (exclusive control) of the color conversion settings" of the information processing apparatus 100 according to the second embodiment of the present invention may be realized by the CPU 106 executing a program, the program having been coded using a programming language in conformity with the operating environment (platform) thereof.

The program may be stored in the computer-readable recording medium 103a.

As the recording medium 103a, a Floppy® Disk, a CD (Compact Disc), a DVD (Digital Versatile Disc), the SD memory card, the USB memory or the like may be used.

In this case, by storing the program in the recording medium 103a, the program may be installed in the information processing apparatus 100 via the drive device 103 that can read the recording medium 103a. Further, as described above, the information processing apparatus 100 may include the interface device 107. In this case, the program may be downloaded and installed in the information processing apparatus 100 via an electric communication line like the Internet.

Although the invention has been described using specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus performing a color conversion process in accordance with a color conversion setting set by an information processing apparatus that generates print data, the image forming apparatus comprising:
   a determination unit configured to determine whether a color conversion setting performed by the information processing apparatus is valid based on received print data, the received print data including information indicating whether the performed color conversion setting is valid or invalid; and
   a control unit configured to control the color conversion process to be performed by the image forming apparatus based on a result determined by the determination unit.

2. The image forming apparatus according to claim 1, wherein
   the determination unit determines whether the valid color conversion setting has been performed by the information processing apparatus based on an analysis result of the print data.

3. The image forming apparatus according to claim 1, wherein
   the control unit comprises a switching unit configured to switch between a standard color conversion process and an extended color conversion process, the standard color conversion process being in accordance with a color conversion setting set by using a standard command, the extended color conversion process being in accordance with a color conversion setting set by using a vendor's own extended command, wherein
   when the determination unit determines that the valid color conversion setting has been performed by the information processing apparatus, the switching unit switches the color conversion process to be performed by the image forming apparatus from the extended color conversion process to the standard color conversion process.

4. The image forming apparatus according to claim 1, wherein
   when at least one of a predetermined Page Description Language (PDL) command and a predetermined data pattern is included in the print data based on an analysis result of the print data, the determination unit determines that the valid color conversion setting has been performed by the information processing apparatus.

5. The image forming apparatus according to claim 3, wherein
   in the image forming apparatus, a default color conversion table where an input color value is a same as an output color value is set as a color conversion table to be used for the standard color conversion process, the color conversion table converting a color value from a device-independent input color value to a device-dependent output color value.

6. The image forming apparatus according to claim 5, wherein when the color conversion table is specified in the valid color conversion setting having been performed by the information processing apparatus, the image forming apparatus switches from the default color conversion table to the specified color conversion table and performs the standard color conversion process.

7. A color conversion control method to be used in an image forming apparatus performing a color conversion process in accordance with a color conversion setting set by an information processing apparatus that generates print data, the color conversion control method comprising:

determining whether a color conversion setting has been performed by the information processing apparatus based on received print data, the received print data including information indicating whether the performed color conversion setting is valid or invalid;

selecting, as the color conversion process to be performed, a standard color conversion process if the determination step determines that the color conversion setting performed by the information processing apparatus in the determination step is valid; and selecting, as the color conversion process to be performed by the image forming apparatus, an extended color conversion process if the determination step determines that the color conversion setting performed by the information processing apparatus in the determination step is not valid, the extended color conversion process being a process that uses a color conversion setting set in accordance with color rendering information of the image forming device, the standard color conversion process being a process that uses a color conversion setting set in accordance with color rendering information of the information processing apparatus.

8. A non-transitory computer-readable recording medium comprising a program encoded and stored in a computer-readable format to cause a computer to execute a color conversion control method according to claim 7.

9. An information processing apparatus having a printer driver configured to receive a color conversion setting through a user interface menu and generate print data including the received setting, wherein the printer driver performs exclusive control between a color conversion setting of Image Color Management (ICM) of the information processing apparatus and a color conversion setting set by a vendor's own extended command in a manner such that the color conversion setting set by the vendor's own extended command is to be performed when the setting of the Image Color Management (ICM) is determined to be invalid ICM.

* * * * *